(12) United States Patent
Laranjeira et al.

(10) Patent No.: US 6,622,261 B1
(45) Date of Patent: *Sep. 16, 2003

(54) PROCESS PAIR PROTECTION FOR COMPLEX APPLICATIONS

(75) Inventors: Luiz A. Laranjeira, Austin, TX (US); Glen W. Gordon, Austin, TX (US); Jill A. Jones, Austin, TX (US); Irma De Leon, Austin, TX (US); Yuan Sylvia Tien, Austin, TX (US); Stephen M. Sanderson, Austin, TX (US); Thomas J. Davidson, Austin, TX (US); Charles Young, Austin, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/210,904

(22) Filed: Aug. 1, 2002

Related U.S. Application Data

(63) Continuation of application No. 09/287,329, filed on Apr. 7, 1999.
(60) Provisional application No. 60/081,205, filed on Apr. 9, 1998.

(51) Int. Cl.[7] .................................................. G06F 11/00
(52) U.S. Cl. .......................................... 714/11; 709/221
(58) Field of Search .............................. 714/11, 12, 13, 714/15, 25, 31, 2, 6, 7, 10, 47; 709/102, 107, 220, 221

(56) References Cited

U.S. PATENT DOCUMENTS

| | | | |
|---|---|---|---|
| 5,027,269 A | | 6/1991 | Grant et al. |
| 5,295,258 A | | 3/1994 | Jewett et al. |
| 5,590,277 A | * | 12/1996 | Fuchs et al. ........... 395/183.14 |
| 5,630,047 A | * | 5/1997 | Wang .................... 395/182.13 |
| 5,708,776 A | | 1/1998 | Kikinis |
| 5,712,971 A | | 1/1998 | Stanfill et al. |
| 5,754,752 A | | 5/1998 | Sheh et al. |
| 5,832,283 A | | 11/1998 | Chou et al. |
| 5,938,775 A | * | 8/1999 | Damani et al. ................ 714/15 |
| 5,951,695 A | | 9/1999 | Kolovson |
| 5,987,621 A | | 11/1999 | Duso et al. |
| 6,035,415 A | * | 3/2000 | Fleming ....................... 714/11 |
| 6,105,148 A | | 8/2000 | Chung et al. |
| 6,145,094 A | * | 11/2000 | Shirriff et al. ................ 714/11 |
| 6,185,702 B1 | | 2/2001 | Shirakihara et al. |
| 6,195,760 B1 | | 2/2001 | Chung et al. |
| 6,266,781 B1 | | 7/2001 | Chung et al. |
| 6,266,785 B1 | | 7/2001 | McDowell |
| 6,317,844 B1 | * | 11/2001 | Kleiman ......................... 714/6 |
| 6,351,829 B1 | * | 2/2002 | Dupont et al. ................ 714/48 |
| 6,477,663 B1 | * | 11/2002 | Laranjeira et al. ............ 714/11 |

\* cited by examiner

*Primary Examiner*—Nadeem Iqbal
(74) *Attorney, Agent, or Firm*—Fenwick & West LLP

(57) ABSTRACT

Techniques using process-pair protection of complex applications are disclosed which provide fast and stateful application failover.

32 Claims, 6 Drawing Sheets

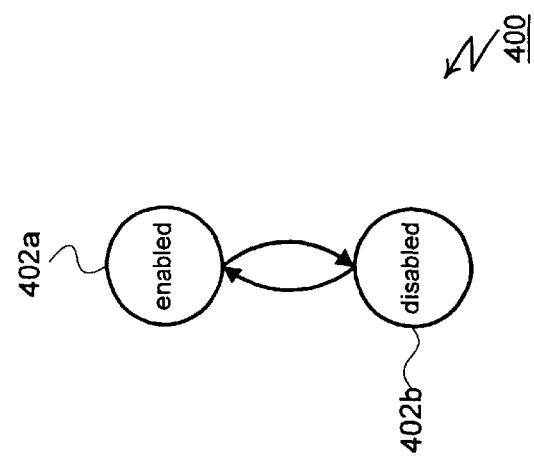
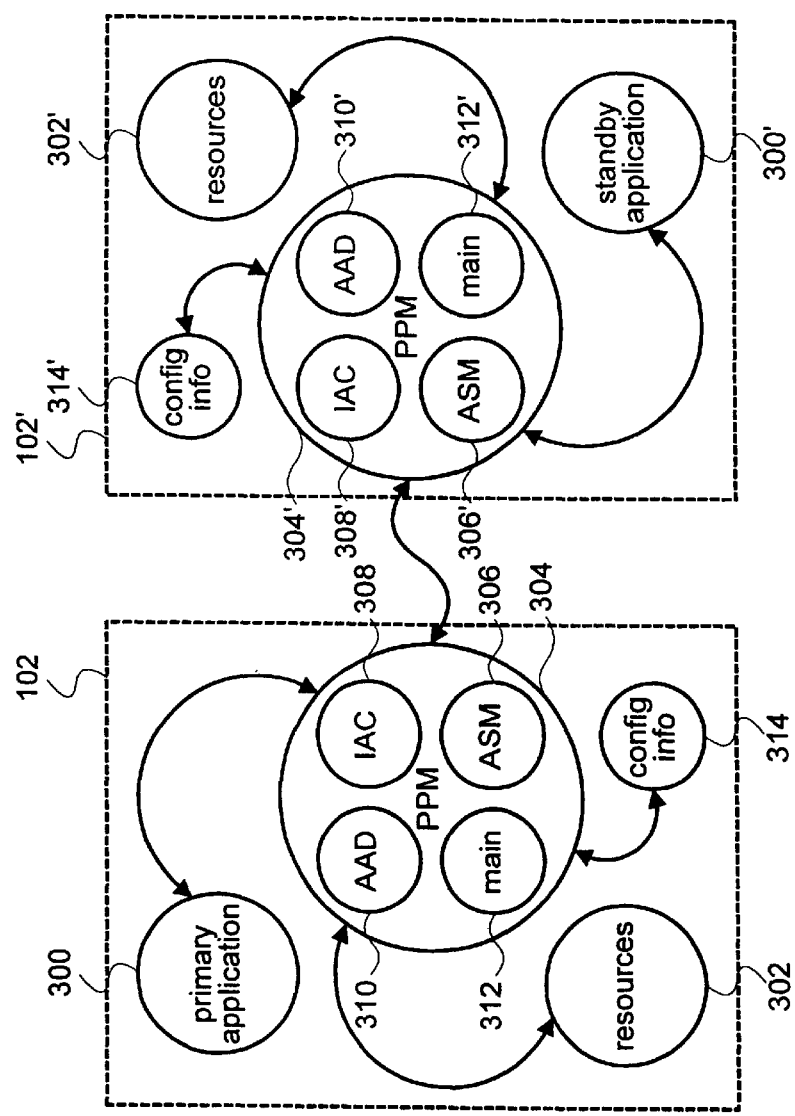

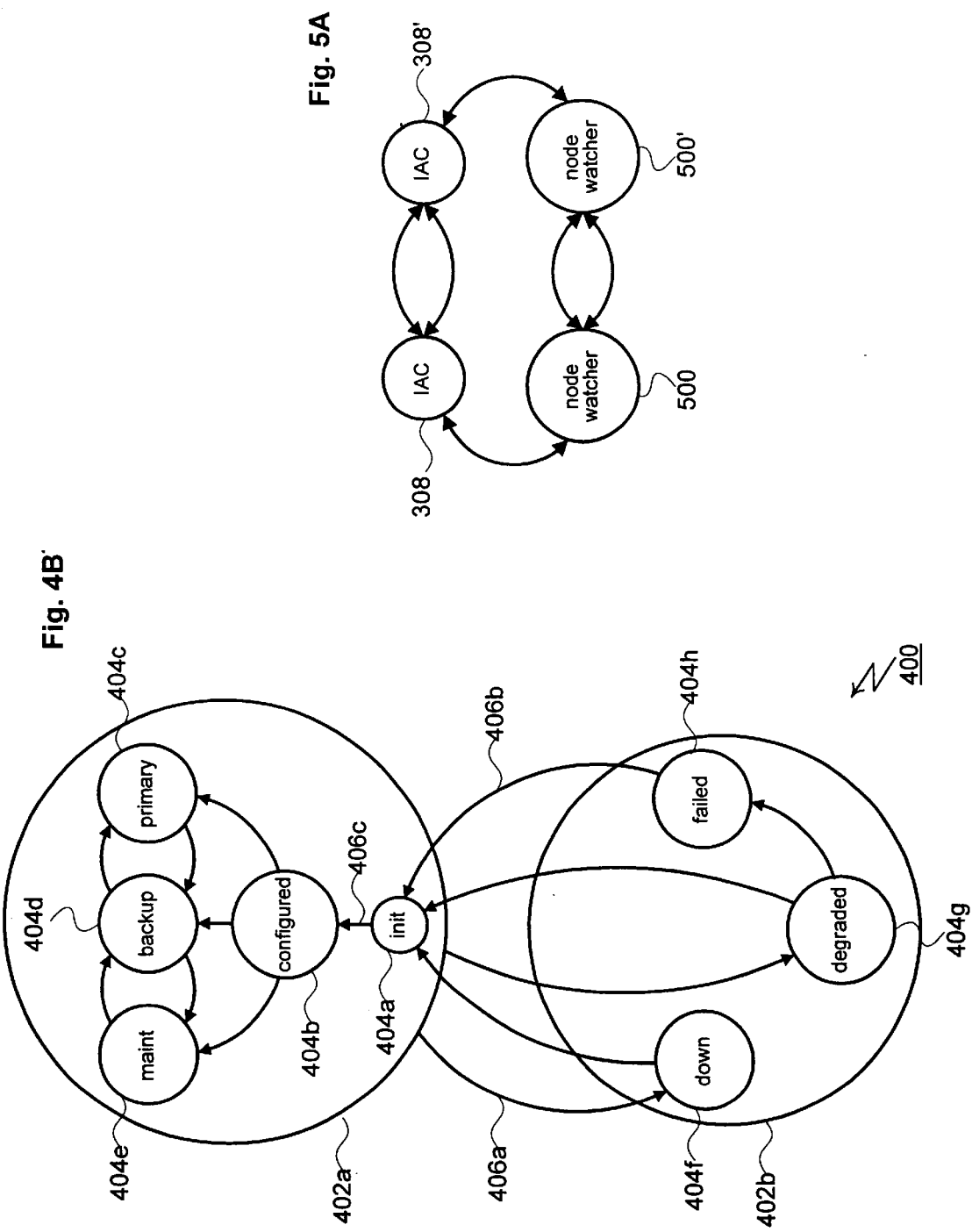

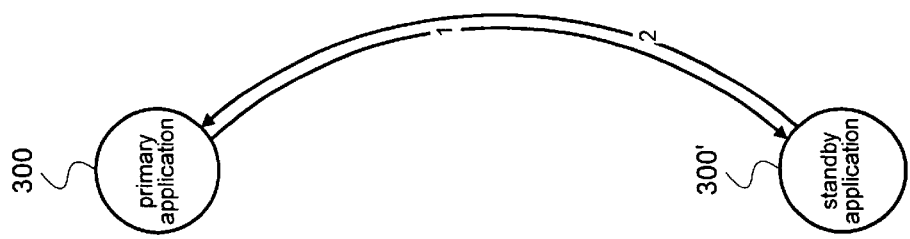
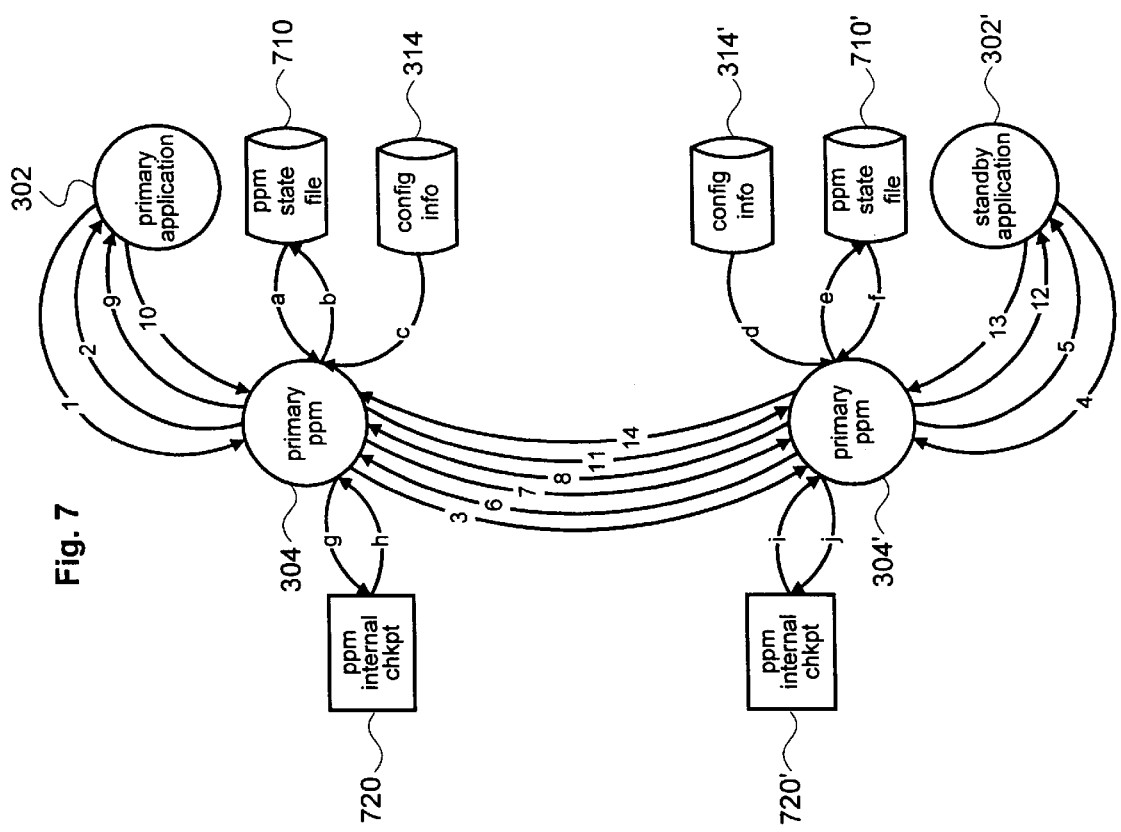
Fig. 8
Fig. 7

PROCESS PAIR PROTECTION FOR COMPLEX APPLICATIONS

RELATED APPLICATIONS

This application is a continuation of U.S. patent application Ser. No. 09/287,329, filed Apr. 7, 1999, which claims the benefit of U.S. Provisional Application No. 60/081,205, filed Apr. 9, 1998. Each of these applications is herein incorporated by reference.

FIELD OF THE INVENTION

The present invention relates generally to fault-tolerant computer systems. More specifically, the present invention includes a method and apparatus that allows complex applications to rapidly recover in the event of hardware or software failures.

BACKGROUND OF THE INVENTION

Reliability is an important aspect of all computer systems. For some applications, reliable computer operation is absolutely crucial. Telephone switching systems and paging systems are good examples of systems where reliable computer operation is paramount. These systems typically operate on a continuous, or near continuous basis. Failures, for even short time periods, may result in a number of undesirable consequences including lost or reduced service or customer inconvenience, with great losses in revenue.

Fault-tolerant computer systems are computer systems that are designed to provide highly reliable operation. One way of achieving fault-tolerance is through the use of redundancy. Typically, this means that a backup computer system takes over whenever a primary computer system fails. Once a backup computer system has assumed the identity of a failed primary computer system, applications may be restarted and service restored.

The use of redundancy is an effective method for achieving fault-tolerant computer operation. Unfortunately, most redundant computer systems experience considerable delay during the failover process. This delay is attributable to the time required to perform the failover and the time required to restart the applications that have been terminated due to a system or software failure. In cases where complex applications are involved, this delay may amount to minutes or even hours. In many cases, delays of this length are not acceptable.

Process-pairs is an effective method for quickly restoring service that was interrupted by a system failure. For a typical process-pair implementation, a process is replicated between two computer systems. One of the processes, the primary process (running on one of the computer systems), provides service, while the other, the backup process (running on the other computer system), is in a standby mode. At periodic times, the state of the primary and backup processes are synchronized, or checkpointed. This allows the backup process to quickly restore the service that was provided by the primary process in the event of a failure of the primary process or of the computer system where it was running.

Process-pairing greatly reduces delays associated with restarting terminated processes. Unfortunately, many complex applications are designed as groups of separate processes. As a result, configuring complex applications to provide process-pair protection may be a difficult task. This difficulty results partially from the need to provide backup processes for each of the processes included in an application. The interdependence of the various processes included in complex applications also contributes to the overall difficulty of providing process-pair protection.

Based on the preceding discussion, it may be appreciated that there is a need for systems that provide process-pair operation for complex applications. Preferably, these methodologies would minimize the amount of specialized design and implementation required for process-pair operation. This is especially important for legacy applications where large scale modifications may be difficult or impractical.

SUMMARY OF THE INVENTION

The present invention provides a method and apparatus for providing process-pair protection to complex applications. A representative environment for the present invention includes two computer systems connected within a computer network or computer cluster, each one executing an instance of a protected application. One application instance is the primary application, and the other is the backup application. The primary application is providing service, while the backup application does not provide service. The backup application, however, is initialized and ready to take over in case of a failure of the primary application or of the computer system where it is running.

Each application instance is managed by an instance of a process called the Process-Pairs Manager (PPM). For convenience, these instances are referred to as the primary PPM and the backup PPM. Each PPM includes an Application State Model (ASM), an Interapplication Communication module (IAC), an Application Administration module (AAD) and a Main module.

Each PPM uses its IAC to communicate with the other PPM. This allows each PPM to monitor the state of the application managed by the other PPM. Each PPM also uses its IAC to monitor the health of the computer system (primary or backup) that hosts the other PPM and its protected application instance. By monitoring application state and system health, each PPM determines when the remote application instance is no longer operable. When the primary application instance stops providing service, the PPM managing the backup application instance detects the fact and begins failover processing. Failover is the operation through which the PPM managing the backup application instance take steps to drive its managed application instance to primary state.

Each PPM uses its AAD to manage the details of the application for which the PPM is responsible (i.e., the application for which the PPM provides process-pair protection). The internal details of a managed application (such as its startup and shutdown programs, maximum time interval values for state transitions, as well as resources associated with the application) are described in a configuration file. The AAD that manages a particular application reads the configuration file at PPM startup time to obtain this information.

Each PPM uses its ASM to define a set of states. For the described embodiment, two main states—enabled and disabled—are defined. The main states are themselves decomposed into finer granularity states. The main state enabled includes the init (application initialization state), configured, primary, backup and maintenance states. The main state disabled includes a down, a degraded and a failed state. The ASM also defines a set of conditions that trigger transitions between states. Given a state, if a certain set of conditions becomes valid, a transition to another specific state occurs. Each transition may have one or more actions associated with it. Actions are steps or procedures that are invoked by the ASM in response to a transition between states.

The ASM operates as a finite state machine. This means that the ASM begins operation by assuming a well-defined initial state. The initial state is determined by information provided by the PPM state file and can be either state down or state init. The ASM monitors various conditions, such as operator commands, application state and system health (the last two being monitored via the IAC). When a change in such conditions triggers a transition that is defined for the current state, the ASM changes its current state to the next defined state. As part of this transition, the ASM invokes any action associated with the transition from current state to the next state. These actions affect the application instance protected by the PPM by managing resources and commanding the application to change state. After each state transition the PPM checkpoints its new internal state.

At PPM startup, the AAD reads the application configuration file to determine how to startup the application that is to be given process-pair protection (i.e., the PPM determines which processes need to be started, etc.), and to acquire specific information that guides the management of the application. Assuming that the initial state is init, the PPM then starts the processes required by the application being given process-pair protection. Once the processes have been started, the PPM checkpoints its internal data structures.

Each started process registers itself with the PPM through a registration message. During process registration the PPM connects to the other PPM that is running concurrently on the other computer system. When all processes have registered with the PPM the ASM transitions to state configured. Until this point the two PPMs running on the two systems behave exactly the same.

When state configured is reached, each of the two PPMs determine the next state of its managed application instance. The application configuration file contains information that determines which PPM will drive its protected application instance to primary state, and which will drive its protected application instance to backup state. After this determination, the ASMs of both PPM change states. The ASM of the PPM that is supposed to be primary transitions to state primary. This causes the PPM to send a message to each application process commanding it to become primary. The ASM of the PPM that is supposed to be backup transitions to the backup state. This causes the PPM to send a message to each application process commanding it to become backup.

After startup, the primary and the backup application instances (each running on a distinct computer system) operate as a pair. The primary application processes, as they provide service, periodically checkpoint their state to the computer system where the backup application is running. Conditions such as an operator command, a failure of the primary application, or a failure of the computer system where the primary application runs, cause a failover to occur. This allows the backup application to replace the primary application as the service provider. Failover is accomplished rapidly. The backup application, which is already initialized, becomes primary by acquiring the necessary state information that was checkpointed by the primary application and continuing processing from the point where the failed primary application was interrupted. In this way, the present invention provides a method and apparatus that provides process-pair protection to complex applications. This allows a complex application to function in a fault-tolerant fashion, which minimizes the delays associated with system failure and recovery.

The maintenance state has the purpose of allowing operators to perform tests on a new version of the application. A newly installed version of the application, running as a backup application instance, is driven to state maintenance by an operator command. This state change does not interfere with the operation of the primary application. After test completion, the application is driven to state backup by another operator command. During state maintenance the application cannot become primary. A failure of the primary application, or of the computer system where it runs, when the other application instance is in state maintenance, causes service interruption because failover cannot occur.

Advantages of the invention will be set forth, in part, in the description that follows and, in part, will be understood by those skilled in the art from the description herein. The advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

FIG. 3 is a block diagram of a primary process-pair manager and backup process-pair manager providing process-pair protection to a complex application.

FIG. 4A is a block diagram of a state machine as used by an embodiment of the present invention.

FIG. 4B is a block diagram of a set of states included within the state machine of FIG. 4A.

FIG. 5A is a block diagram of an inter-application communication module as used by an embodiment of the present invention.

FIG. 7 is a block diagram showing the messages exchanged during initialization of an embodiment of the present invention.

FIG. 8 is a block diagram showing the messages exchanged during a checkpointing operation as performed by an embodiment of the present invention.

DETAILED DESCRIPTION

Reference will now be made in detail to preferred embodiments of the invention, examples of which are illustrated in the accompanying drawings. Wherever convenient, the same reference numbers will be used throughout the drawings to refer to the same or like parts.

ENVIRONMENT

Figure 1:
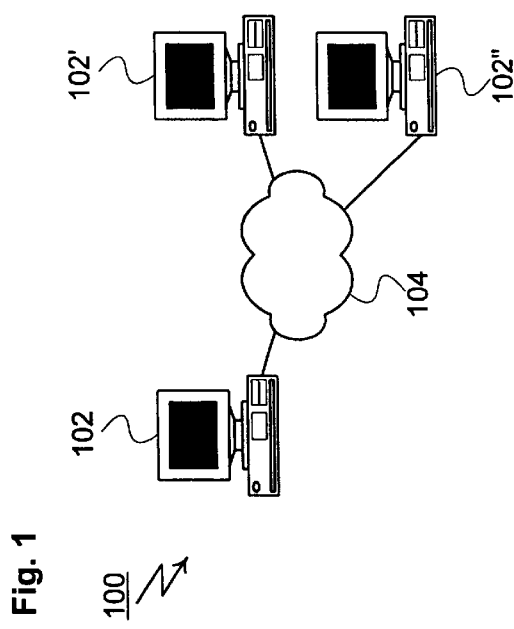
FIG. 1 is a block diagram of a computer network or cluster shown as an exemplary environment for an embodiment of the present invention.

In FIG. 1, a computer network 100 is shown as a representative environment for the present invention.

Structurally, computer network 100 includes a series of computer systems, of which computer systems 102, 102' and 102" are representative. Computer systems 102 are intended to be representative of a wide range of computer system types including personal computers, workstations and mainframes. Although three computer systems 102 are shown, computer network 100 may include any positive number of computer systems 102. Computer systems 102 may operate under distinct operating system types. For the described embodiment, computer systems 102 preferably operate under control of UNIX® or UNIX-like operating systems. Computer systems 102 are interconnected via computer network 104. Network 104 is intended to be representative of any number of different types of networks.

Figure 2:
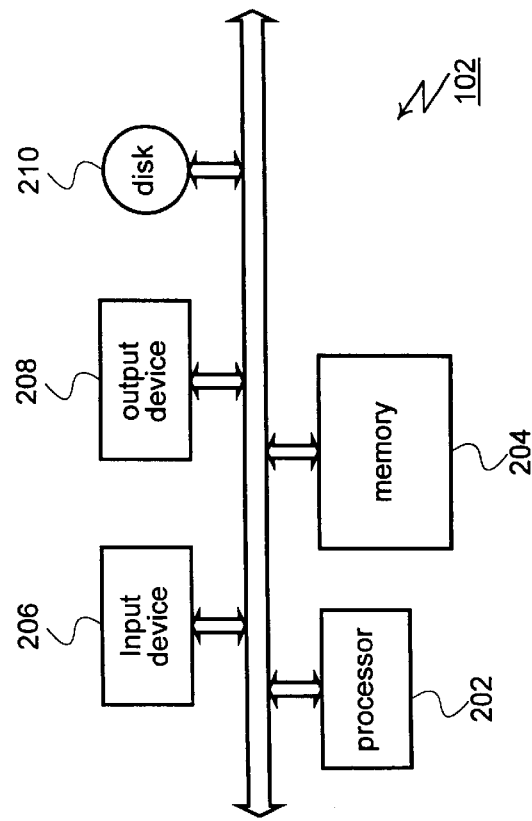
FIG. 2 is a block diagram of an exemplary computer system as used in the computer network of FIG. 1.

As shown in FIG. 2, each computer system 102 includes a processor, or processors 202, and a memory 204. An input device 206 and an output device 208 are connected to processor 202 and memory 204. Input device 206 and output device 208 represent a wide range of varying I/O devices such as disk drives, keyboards, modems, network adapters, printers and displays. Each computer system 102 also includes a disk drive 210 of any suitable disk drive type (equivalently, disk drive 210 may be any nonvolatile storage system such as "flash" memory).

PROCESS-PAIR MANAGER

The present invention provides a method and apparatus for providing process-pair protection to complex applications. FIG. 3 shows a typical deployment of the present invention. Application 300 is intended to be representative of complex applications. One of the computer systems 102, such as computer system 102, hosts the primary application 300. Application 300 may include a series of programs, which may be activated (alone or in concert) at different times during the use of application 300. Application 300 interacts with zero or more resources 302. Resources 302 include the physical and logical entities that programs interact with, such as permanent storage devices and networking adapters.

Computer system 102' is the host computer system for backup application 300' and backup resources 302'. Backup application 300' is a replicated instance of the same entity within computer system 102. Backup resources 302' represent the same entities within computer system 102. For shareable resources, such as dual-ported disks, this means that the resources are continuously available on both computer system 102 and computer system 102'. For other resources, this means that the resources are either replicated or movable from computer system 102 to computer system 102' (and vice-versa) during failover processing. Backup application 300' and backup resources 302' function as backups or replacements for application 300 and resources 302 in the event that computer system 102 fails.

To manage applications 300 and 300' and resources 302 and 302' computer system 102 and computer system 102' each include respective instances of a Process Pair Manager or PPM 304. For convenience, these instances are referred to as primary PPM 304 and backup PPM 304'. PPMs 304, 304' include respective Application State Models, or ASMs 306, 306' Interapplication Communications Modules, or IACs 308, 308', Application Administration Modules, or AADs 310, 310' and Main modules 312, 312'.

As shown in FIG. 4A, ASMs 306 implement finite state machines 400. Each finite state machine 400 includes main states 402, of which main states 402a and 402b are representative. Each main state is composed by a series of states 404, of which states 404a through 404h are representative.

Each ASM 306 maintains one of states 404 as a current state 404. It is said that the PPM 304 or its protected application 300 is in the current state 404. States 404 are interconnected with transitions 406. Transitions 406 are symbolic paths traversed by ASMs 306 as they change their current states 404. Each transition 406 may have one or more associated actions. Each action specifies a sequence of steps executed by ASMs 306 when traversing the associated transition 406. In other words, actions specify the steps performed by ASMs 306 when moving between states 404.

ASMs 306 preferably allow main states 402, states 404, transitions 406 and the actions associated with transitions 406 to be dynamically configured. For the described embodiment, this is accomplished by having ASMs 306 read respective configuration files as part of their initialization processes. Dynamic configuration allows the behavior of ASMs 306 and PPMs 304 to be adapted to different environments. As shown in FIG. 4A, ASMs 306 are configured to include main states enabled and disabled. Main state enabled 402a, shown in FIG. 4B, is actually a collection of init, configured, primary, backup and maintenance states (404a, 404b, 404c, 404d and 404e, respectively). Main state disabled 402b, shown in FIG. 4B, includes down, degraded and failed states (404f, 404g, and 404h, respectively). Each PPM 304 enters the init state 404e, when so configured, at startup. After initialization, primary PPM 304 moves from init state 404a to configured state 404b. In configured state 404b PPM 304 makes a decision to drive application 300 to primary state 404c, based on information that it is supposed to be primarily read from the application configuration file. In primary state 404c, primary PPM 304 causes application 300 to provide service. PPM 304' follows initialization by moving to configured state 404b and from there to backup state 404d, based on information that it is supposed to be backup read from the application configuration file. In backup state 404d, backup PPM 304' causes application 300' to function in a backup mode. Primary PPM 304 and backup PPM 304' move between primary state 404c and backup state 404d on an as-needed basis. Backup PPM 304' makes this transition upon detecting that primary application 300 or the computer system where it runs 102 has failed. Backup PPM 304' and primary PPM 304 may also swap between states 404c and 404d in response to operator command. Transitions between backup state 404d and maintenance state 404e, as well as from primary state 404c to backup state 404d can only happen through operator command.

Down state 404f, degraded state 404g and failed state 404h each indicate abnormal operation of application instances 300. Failure of a computer system 102 causes the local PPM 304 (i.e., the PPM on that computer system 102) and its managed application instance 300 to be seen as in down state 404f. Failure of an application 300 that is in any state 404 of the main enabled state 402a causes the local PPM 304 to transition to degraded state 404g. Degraded state 404g indicates that a PPM 304 will make a decision whether or not to recover application 300. The PPM 304 counts the number of failures undergone by application 300 through time. Within a given configurable probation time interval the PPM 304 recovers application 300 if it fails up to a maximum configurable number of times. If the PPM 304 decides to recover failed application 300 it first brings down any portions (processes) of application 300 that may still be operational and transitions to state init 404a where it restarts the whole application 300. If application 300 fails more than the maximum configured number of times within the configured probation time interval, the PPM 304 does not recover it and it enters failed state 404h. The configurable maximum number of failures and the probation period are specified in the application configuration file read by the PPM 304 at startup time. The only transitions leaving down state 404f or failed state 404h are caused by an operator command and lead to init state 404a.

In general, it should be appreciated that the specific states 404 shown for state machine 400 are intended to be representative. For other embodiments ASMs 306 may be configured to include more, or fewer states 404. The particular transitions 406 shown in FIG. 4B are also representative. Other embodiments may include more, less or different transitions 406. The ability to include other main states 402, states 404 and transitions 406 allows PPMs 304 to be adapted to the needs of differing environments and applications.

ASM 306 are also preferably implemented to allow states 404 to have qualifiers. Qualifiers are conditions that alter the actions taken by ASMs 306 and PPMs 304. Qualifiers are set and reset by operator commands and are recorded in the PPM state file. A split qualifier is an example of a condition of this type. The split qualifier is set to indicate that the backup application 300' is undergoing an upgrade which causes the primary components (i.e., primary PPM 304 and primary application 300) to be incompatible with their backup counterparts with respect to the data they operate upon. As a result, certain operations, such as checkpointing of data from primary application 300 to backup application 300' cannot be safely performed during such an upgrade. The split qualifier, when set prevents application 300 operating in primary state 404c and application 300' operating in backup state 404d from creating or recovering (respectively) checkpoints. If a failover occurs while the split qualifier is set, the backup application 300', that is becoming primary, does not recover a checkpoint from the failed primary application 300.

Another example of a qualifier is the inhibit qualifier. The inhibit qualifier, when set, precludes PPM 304' and its protected application 300' from transitioning to primary state 404c. If PPM 304' and its managed application 300' are in backup state 404d and the operator sets the inhibit qualifier, the PPM 304' and its managed application 300' transition to maintenance state 404e. When in maintenance state 404e and the inhibit qualifier is reset, a transition to backup state 404d occurs. If the PPM 304' is shutdown with the inhibit qualifier set, when the PPM 304 is started up again, during initialization, it reads from its state file that the inhibit qualifier is set. As a result, upon reaching configured state 404b, the PPM 304' drives its protected application 300' to maintenance state 404e.

The third example of a qualifier is the disable qualifier. When the disable qualifier is set PPM 304, while in its initialization, sets the initial state of application 300 to down state 404f and does not start application 300. If the disable qualifier is not set, PPM 304 sets the initial state to init state 404a and starts up application 300.

As shown in FIG. 5A, IACs 308 communicate with each other. This allows each PPM 304 to communicate with the other PPM 304'. PPMs 304 use this communication to monitor the state 404 of the other PPM 304' and its protected application 300'. IACs 308 also communicate with a node watcher 500. This allows each PPM 304 to determine if the computer system 102' that hosts the other PPM 304' and its protected application instance 300' is up or down. Node watcher 500 is intended to be representative of a number of different techniques for monitoring system health. In some cases, node watcher 500 will be implemented as a set of heartbeat processes distributed among computer systems 102. Each heartbeat process would periodically broadcast the health of its computer system 100 using network 104. This allows listening computer systems 102 to determine if a particular computer system 102' is up or down. In other cases, node watcher 500 will be implemented as part of the transport mechanism of network 104.

Figure 5B:
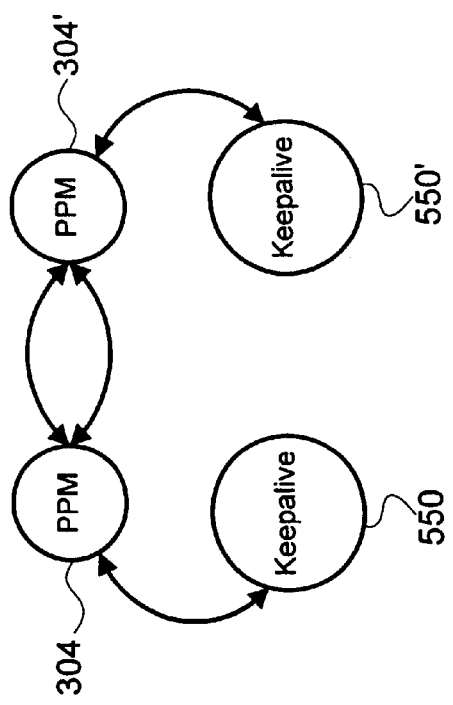
FIG. 5B is a block diagram of a pair of keepalive processes as used by an embodiment of the present invention.

As shown in FIG. 5B, in order to enhance the availability of the PPM 304 and be able to recover from its failures, a watchdog process called Keepalive 550 runs on computer system 102 and monitors PPM 304. If PPM 304 fails, Keepalive 550 detects the fact and restarts PPM 304. In the same manner, in computer system 102' Keepalive 550' monitors PPM 304' and restarts it when it fails.

AADs 310 provide an abstract interface to applications 300. To provide this interface, each AAD 310 is configured to interact with the components (i.e., programs and resources) that are included in an application 300. In effect, PPMs 304 interact with AADs 310 and AADs 310s interact with the components of applications 300. The interface provided by AADs 310 allows PPM 304 to perform a set of predefined operations on applications 300. The operations include: application startup, application cleanup and restart, graceful application shutdown, and forceful application shutdown. The AAD interface also allow PPMs 304 to change the state 404 of application 300 and allows applications 300 to query their PPMs 304 for the current state 404.

Each AAD 310 reads an application configuration file as part of its initialization process. The application configuration file describes the programs and parameters that the AAD 310 uses to perform the predefined operations. Use of a configuration file allows AADs 310 to be quickly adapted to interface with different applications 300.

Figure 6:
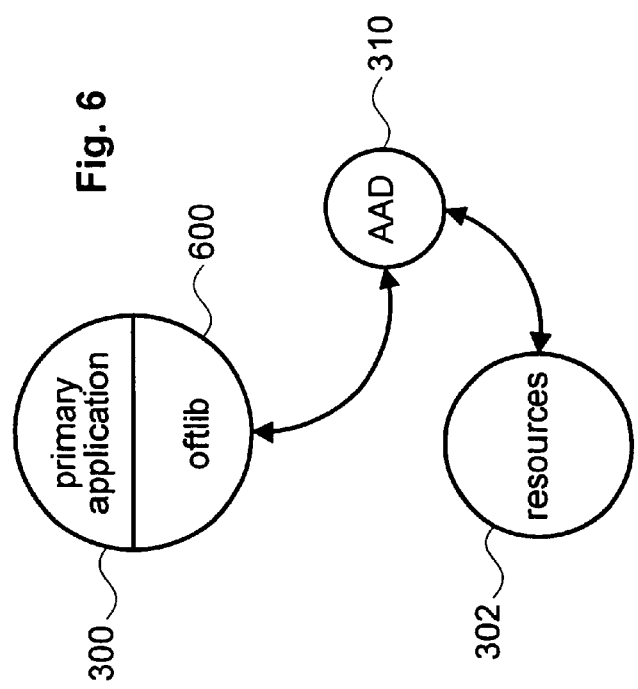
FIG. 6 is a block diagram of an application administration module as used by an embodiment of the present invention.

As shown in FIG. 6, AADs 310 communicate with applications 300 through an Open Fault Tolerance Library or OFTLIB 600. OFTLIB 600 is linked with applications 300. The communication between AAD 310 and OFTLIB 600 is preferably accomplished using a messaging mechanism. Other embodiments may, however, use other suitable techniques for interprocess communication.

FIG. 7 shows a series of messages exchanged between PPM 304 and PPM 304' during initialization of application 300 and application 300'. The first of these messages, marked 1, is representative of the registration message sent by each process of application 300 (which for simplicity is shown here to be composed of only one process) to primary PPM 304. The registration message 1 informs PPM 304 that application 300 has started. PPM 304 responds to the registration message 1 with an acknowledgement (ack) message 2. While awaiting for application processes to register PPM 304 establishes a connection with PPM 304' and sends message 3 informing PPM 304' that it is in init state 404a.

Meanwhile a similar sequence of operations is happening between PPM 304' and its protected application 300'. Processes of application 304' register with PPM 304' sending registration message 4. PPM 304' responds with ack message 5. Since a connection between the two PPMs 304 and 304' is now established, PPM 304' sends message 6 to PPM 304 informing that it is in init state 404a.

When all processes of application 300 have registered with PPM 304, PPM 304 transitions from init state 404a to configured state 404b, performs a checkpoint of its internal address space, and sends message 7 to PPM 304' stating that it is in configured state 404b. Concurrently, PPM 304' transitions to configured state 404b and sends counterpart message 8 to PPM 304.

In configured state 404b PPM 304 decides that, based on information read (c) from the configuration file of application 300, it should become primary. As a result PPM 304 sends message 9 to each process of application 300 commanding it to become primary. Processes of application 300 respond to PPM 304 with an ack message 10 stating that they changed to primary state 404c. PPM 304 changes state to primary state 404c and sends message 11 to PPM 304' informing of that.

In configured state 404b PPM 304' decides that, based on information read (d) from the configuration file of application 300', it should become backup. As a result, PPM 304' sends message 12 to each process of application 300' commanding it to become backup. Processes of application 300' respond to PPM 304' with ack message 13, stating that they changed to backup state 404d. PPM 304' transitions to backup state 404d and informs PPM 304 of that fact with message 14.

During initialization PPM 304 and PPM 304' read from the PPM state file 710 and 710' (operations a and f) the values of state qualifiers. During normal operation PPM 304 and PPM 304' may be commanded by the operator to change the value of state qualifiers split, inhibit or disable. When that happens, besides a possible state change, PPM 304 and 304' record the new value of the qualifier in the PPM state file 710 or 710' (operations b and e in FIG. 7).

When PPM 304 changes state it performs a checkpoint (operation g) to an area in memory 720. This checkpoint is to be used for the recovery of PPM 304 it fails and is restarted by Keepalive 316.

FIG. 8 shows a series of messages exchanged to checkpoint the state of primary application 300 to backup application 300'. Upon the occurrence of a new transaction or upon servicing a new client request, primary application 300 sends its new internal state to backup application 300'. This is represented by message 1. Backup application 300' acknowledges receipt of the state information by sending acknowledgment message 2. Backup application 300' uses the information provided by checkpoints from primary application 300 to perform failover processing when becoming primary.

Figure 9:
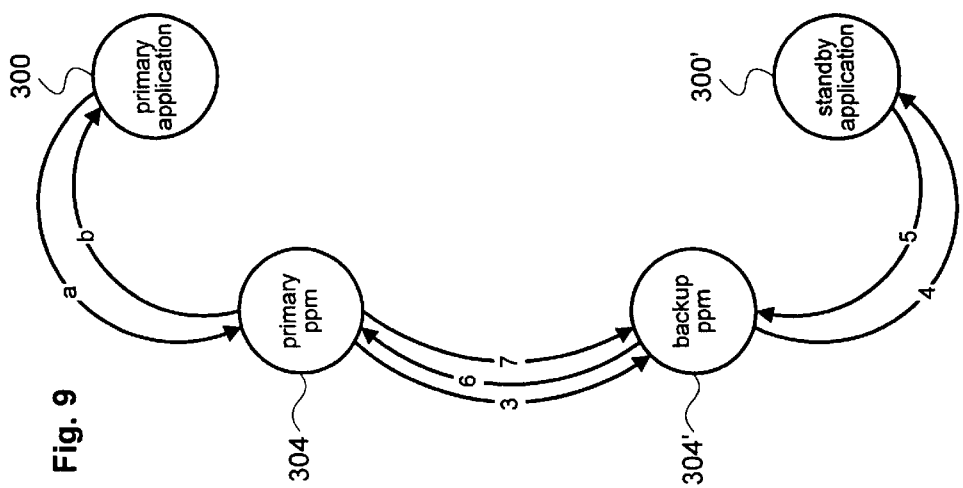
FIG. 9 is a block diagram showing the messages exchanged by an embodiment of the present invention following failure of a primary application.

FIG. 9 shows a series of messages and operations that result from a failure of primary application 300. Since at startup PPM 304 spawns primary application 300, when one process of application 300 fails PPM 304 receives a signal (OS interruption) indicating that one of the processes it spawned died. This signal is represented in FIG. 9 by operation a. As a result, PPM 304 transitions to degraded state 404g. Actions related to this transition include sending message 3 to PPM 304' (to inform that application 300 is in degraded state 404g), and performing a cleanup operation b of the remainder of application 300 (if there are other processes of application 300 that survived the failure). The cleanup operation kills all processes of failed application 300. When PPM 304' receives message 3 from PPM 304 it performs resource transfers (if needed) and sends message 4 to the processes of backup application 300' commanding each to become primary. Resource transfers are performed if there are resources that need to be switched from computer system 102 to computer system 102' to be used by application 300' as it becomes primary. Upon receiving message 4, processes of application 300' change to primary state 404c and acknowledge the fact with an ack message 5 sent to PPM 304'. PPM 304' sends message 6 to PPM 304 informing that it has (with its protected application) changed to primary state 404c. After sending message 3 to PPM 304', PPM 304 decides whether application 300 should be restarted. If so, it proceeds to execute application startup operations described in FIG. 7 (which are omitted in FIG. 9 for simplicity). Otherwise PPM 304 sends message 7 to PPM 304' informing that application 300 is in failed state 404h.

Figure 10:
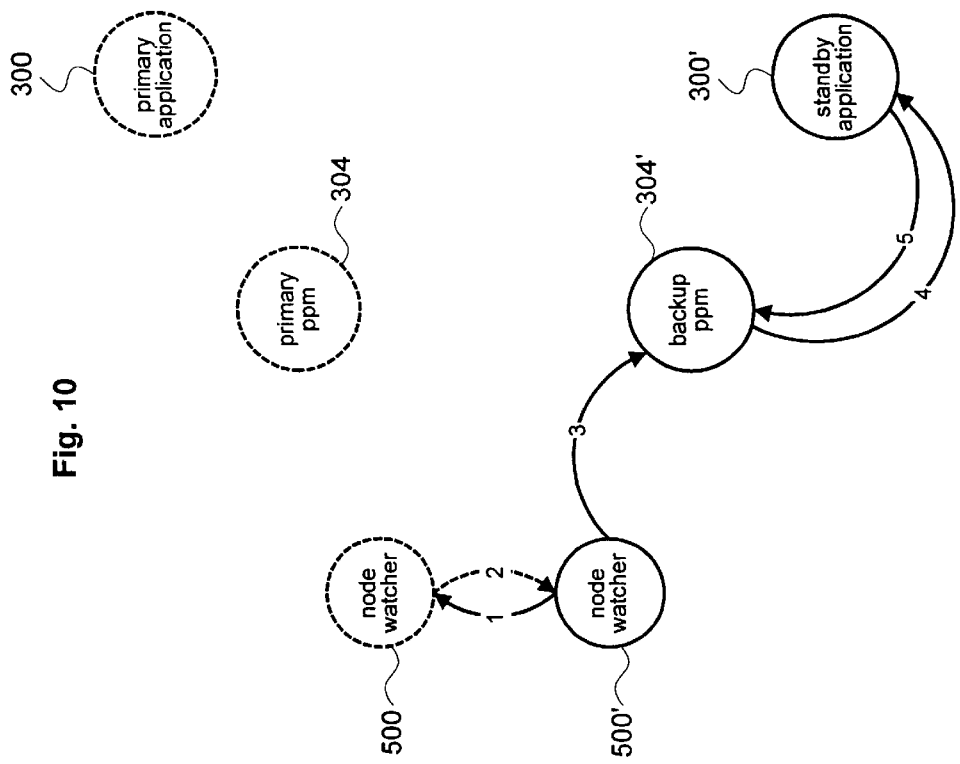
FIG. 10 is a block diagram showing the messages exchanged by an embodiment of the present invention following failure of a computer system where the primary application runs.

FIG. 10 shows a series of messages that result from the failure of computer system 102 that hosts the primary application 300, the primary PPM 304 and the node watcher 500. If computer system 102 fails, node watcher 500, PPM 304 and application 300 are no longer running (they are shown in dashed lines in FIG. 10). Node watcher 500' detects heartbeat failure from node watcher 500 (message 2 missing) and informs PPM 304' (message 3) that the computer system 102 has failed. As a result PPM 304' performs resource transfers (if needed) and sends message 4 to each process of backup application 300' commanding it to become primary. Resource transfers are performed if there are resources that need to be switched from computer system 102 to computer system 102' to be used by application 300' as it becomes primary. Upon receiving message 4 processes of application 300' change to primary state 404c and send message 5 (ack) to PPM 304' informing that fact. PPM 304' transitions to primary state 404c. When computer system 102 is rebooted by the operator node watcher 500 and PPM 304 are restarted. PPM 304 proceeds to execute application startup operations described in FIG. 7 (which are omitted in FIG. 10 for simplicity).

Scenarios describing failures of the backup application and of the computer system running the backup application are similar to what was described in FIG. 9 and FIG. 10 for the primary application and its host computer system. However, failures of the backup application, or of its host computer system, do not cause a state change of the primary application, which continues to deliver services normally.

What is claimed is:

1. An apparatus for providing continuous availability to complex applications -through the use of process-pair protection to allow fast and stateful application failover, the apparatus comprising:
   a primary process-pair manager configured to manage a primary instance of a complex application, the primary process-pair manager defining a plurality of states and conditions that trigger transitions between states, each transition associated with one or more actions executed by the primary process-pair manager; and
   a backup process-pair manager configured to manage a backup instance of the complex application, the backup process-pair manager and the backup instance of the complex application for replacing the primary process-pair manager and the primary instance of the complex application in the event of failure associated with the primary instance of the complex application.

2. The apparatus of claim 1 wherein the one or more actions executed by the primary process-pair manager include at least one of managing resources, commanding the primary instance of a complex application to change state, checkpointing a new state, and sending a message to the backup process-pair manager.

3. The apparatus of claim 1 wherein backup process-pair manager defines a plurality of states and conditions that trigger transitions between states, each transition associated with one or more actions executed by the backup process-pair manager.

4. The apparatus of claim 3 wherein the one or more actions executed by the backup process-pair manager include at least one of managing resources, commanding the backup instance of a complex application to change state, checkpointing a new state, and sending a message to the primary process-pair manager.

5. The apparatus of claim 1 wherein a watchdog process monitors the primary process-pair manager and restarts the primary process-pair manager in case of failure.

6. The apparatus of claim 1 wherein a watchdog process monitors the backup process-pair manager and restarts the backup process-pair manager in case of failure.

7. The apparatus of claim 1 further comprising:
a node watcher configured to inform the backup process-pair manager of failures associated with the primary process-pair manager.

8. The apparatus of claim 1 further comprising:
a node watcher configured to inform the primary process-pair manager of failures associated with the backup process-pair manager.

9. The apparatus of claim 1 wherein the primary instance of the complex application is adapted to periodically perform a checkpointing operation by sending internal state information to the backup instance of the complex application.

10. The apparatus of claim 1 further comprising:
at least one application administration module configured to provide an interface between one of the process-pair managers and components of the corresponding complex application.

11. The apparatus of claim 1 further comprising:
at least one interapplication communication module configured to facilitate communication between the process-pair managers.

12. The apparatus of claim 1 wherein the apparatus is a computer program product stored on a computer readable medium.

13. The apparatus of claim 1 wherein the primary process-pair manager is located on a primary computer system and the backup process-pair manager is located on a backup computer system.

14. A method for providing high availability to complex applications through the use of process-pair protection to allow fast and stateful application failover, the method comprising:
receiving an indication of a failure associated with a primary instance of an application that includes a plurality of processes;
in response to the indicated failure, transitioning a primary process-pair manager to a disabled state thereby causing the primary instance of the application to stop providing service; and
transitioning a backup process-pair manager from a backup state to a primary state thereby causing an initialized backup instance of the application to become the primary service provider by acquiring state information that was checkpointed by the primary application.

15. The method of claim 14 wherein the transitioning the primary process-pair manager to a disabled state includes sending a message thereby commanding each process of the backup instance of the application to become primary.

16. The method of claim 14 wherein prior to receiving the indication of the failure, the method further comprises:
periodically checkpointing state information associated with the processes of the primary instance to the backup instance of the application.

17. The method of claim 14 wherein transitioning the primary process-pair manager to a disabled state further causes a cleanup operation where processes of the primary instance of the application that survived the failure are stopped.

18. The method of claim 14 wherein transitioning the primary process-pair manager to a disabled state further causes a transfer of resources that need to be used by the backup instance of the application as it becomes primary.

19. The method of claim 14 wherein the disabled state is one of down, degraded, or failed.

20. An apparatus for providing continuous availability to complex applications through the use of process-pair protection to allow fast and stateful application failover, the apparatus comprising:
a primary process-pair manager means configured to manage a primary instance of a complex application, the primary process-pair manager means defining a plurality of states and conditions that trigger transitions between states, each transition associated with one or more actions executed by the primary process-pair manager; and
a backup process-pair manager means configured to manage a backup instance of the complex application, the backup process-pair manager means and the backup instance of the complex application for replacing the primary process-pair manager means and the primary instance of the complex application in the event of failure associated with the primary instance of the complex application.

21. The apparatus of claim 20 wherein a watchdog process means monitors the primary process-pair manager means and restarts the primary process-pair manager means in case of failure.

22. The apparatus of claim 20 wherein a watchdog process means monitors the backup process-pair manager means and restarts the backup process-pair manager means in case of failure.

23. The apparatus of claim 20 further comprising:
a node watcher means configured to inform the backup process-pair manager means of failures associated with the primary process-pair manager means.

24. The apparatus of claim 20 further comprising:
a node watcher means configured to inform the primary process-pair manager means of failures associated with the backup process-pair manager means.

25. The apparatus of claim 20 further comprising:
at least one application administration means configured to provide an interface between one of the process-pair manager means and components of the corresponding complex application.

26. The apparatus of claim 20 further comprising:
at least one interapplication communication means configured to facilitate communication between the process-pair manager means.

27. The apparatus of claim 20 wherein the primary process-pair manager means is located on a primary system means and the backup process-pair manager means is located on a backup system means.

28. A computer program product, stored on electronically-readable medium, for providing high availability to complex applications through the use of process-pair protection to allow fast and stateful application failover, wherein in response to the computer program product being executed by a processor, the processor performs the steps of:
receiving an indication of a failure associated with a primary instance of an application that includes a plurality of processes;

in response to the indicated failure, transitioning a primary process-pair manager to a disabled state thereby causing the primary instance of the application to stop providing service; and transitioning a backup process-pair manager from a backup state to a primary state thereby causing an initialized backup instance of the application to become the primary service provider by acquiring state information that was checkpointed by the primary application.

29. The computer program product of claim 28 wherein the transitioning the primary process-pair manager to a disabled state causes a message to be sent thereby commanding each process of the backup instance of the application to become primary.

30. The computer program product of claim 28 wherein transitioning the primary process-pair manager to a disabled state further causes a cleanup operation where processes of the primary instance of the application that survived the failure are stopped.

31. The computer program product of claim 28 wherein transitioning the primary process-pair manager to a disabled state further causes a transfer of resources that need to be used by the backup instance of the application as it becomes primary.

32. The computer program product of claim 28 wherein prior to receiving the indication of the failure, the processor performs the step of:

periodically checkpointing state information associated with the processes of the primary instance to the backup instance of the application.

* * * * *